Jan. 17, 1928.
C. H. HAPGOOD
1,656,435
WEIGHING SCALE
Filed April 2, 1926
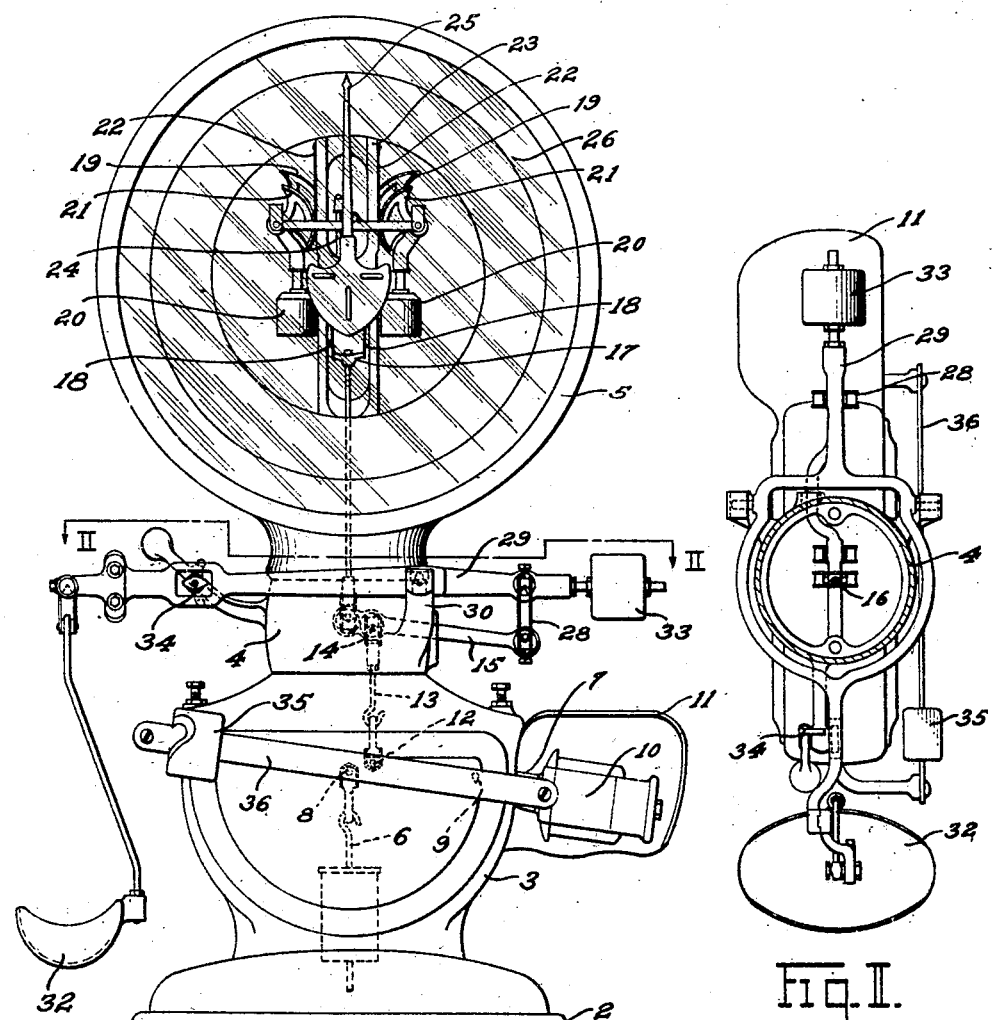
Fig.I.
Fig.II.
Inventor
Clarence H. Hapgood
By C. M. Marshall
Attorney Patented Jan. 17, 1928.

1,656,435

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed April 2, 1926. Serial No. 99,263.

This invention relates to weighing scales, and more particularly to scales of the type used for counting articles by weight. The scale with which the present invention is concerned is of the type known as a ratio counting scale—i. e., one in which the major portion of the weight of the bulk of articles upon the main platform is substantially offset or counterbalanced by a comparatively small number of similar articles placed in a supplemental load receiver. The leverage of the ratio mechanism is of such a multiple that an article in the supplemental or ratio pan counterbalances any desired number of identical articles upon the main platform, as, for example, 50 or 100.

One of the principal objects of this invention is the provision of an efficient counting mechanism incorporated in an automatic scale.

Another object is the provision of a combined weighing and counting scale, the mechanism being capable of use as a counting device or weighing machine as occasion may require without material change or adjustment of the mechanism.

Another object is the provision of simple and efficient counting mechanism which is constructed into a compact unit suitable for incorporation in a weighing scale without necessitating material changes in the weighing mechanism per se.

A further object of the invention is to provide a combined weighing and counting device which is constructed of a minimum number of parts and is of simple and compact construction and not liable to get out of order.

Other objects and advantages will be apparent from the following description, in which reference is had to the accompanying drawings illustrating a preferred embodiment of my invention and wherein similar reference numerals designate similar parts throughout the several views.

In the drawings:

Figure I is an elevational view of a weighing scale embodying my invention;

Figure II is a horizontal sectional view through the scale taken substantially on the line II—II of Figure I.

Referring to the drawings in detail, I have shown the counting mechanism of my invention as incorporated in an automatic pendulum scale of the type known as a bench scale, but it is to be understood that my invention may be incorporated in any type of mechanism wherever it may be found desirable.

The mechanism illustrated comprises a substantially hollow base 1 housing and supporting the platform levers (not shown) which in turn support the main load-receiving platform 2. An upright housing 3 is erected at the rear of the platform and is surmounted by a collar 4 which in turn is surmounted by a circular watch-case-shaped casing 5 supporting and enclosing the automatic indicating and load-counterbalancing mechanism, which will hereinafter be more fully described.

The platform supporting levers are operatively connected by means of a steelyard rod 6 to an intermediate lever 7, as at 8, the lever 7 being suitably fulcrumed within the housing 3 by means of the knife edge pivots 9. The lever 7 is provided at one end with an adjustable weight 10 for sealing the lever mechanism of the scale, the weight being protected from accidental injury by means of a suitable cover 11.

The lever 7 is provided with pivots 12 which are connected by means of a link 13 to pivots 14 affixed intermediate the ends of a comparatively short supplemental lever 15. The short arm of the lever 15 is connected by means of a link 16 to an equalizer bar 17, in turn secured to the lower ends of flexible metallic ribbons 18 which pass over and are secured to the curved surfaces of the cam sectors 19 forming elements of the load-counterbalancing pendulums 20. The pendulums are provided with fulcrum sectors 21 which are secured to and suspended from flexible metallic ribbons 22, the upper ends of the ribbons being fixed to a supporting frame 23. The load-counterbalancing mechanism is connected by rack 24 and pinion mechanism (not shown) to an indicating hand 25 suitably adapted to co-operate with a graduated chart 26.

In the operation of the weighing mechanism per se, a load upon the platform 2 exerts a downward force upon the steelyard rod 6, which force is transmitted through the medium of the links 13 and 16 and levers 7 and 15 to the pendulum mechanism, causing the pendulums to swing upwardly and outwardly to counterbalance the load and the indicating hand to cooperate with the chart 26 to indicate the weight of the load.

The counting mechanism comprises an intermediate multiplying lever 15, one end of which is connected by means of the link 28 to the counting beam or lever 29 suitably fulcrumed upon brackets 30 forming integral parts of a collar 4. This collar is fixedly interposed between the housing 3 and casing 5, the lever 29 being open and surrounding the collar 4. One end of the lever 29 is equipped with a ratio or specimen pan 32, and the other end is provided with an adjustable sealing or balancing weight 33.

It will be obvious from the foregoing description that the counting mechanism being supported upon the collar 4 is capable of incorporation in many various forms of weighing scales and in such form provides a simple and efficient counting attachment. In order to adapt the mechanism for use in scales having lever mechanisms of various multiplications, it would be necessary to alter the multiplication of the counting lever mechanism to properly co-operate with the weighing mechanism and secure the proper ratio between the scale platform and the specimen pan.

If the counting lever 29 be locked by means of the lever locking device 34 the link 28 will act merely as a fulcrum support for the supplemental multiplying lever 15, and the pull resulting from a load placed upon the platform will be transmitted to the load-counterbalancing mechanism in the manner hereinbefore explained.

When it is used as a counting scale one or more specimens of the lot of articles to be counted is placed in the specimen pan 32. If the multiplication of the lever mechanism between the specimen pan and the platform is 100 it will take 100 articles on the platform to balance the counting lever 29 with one article in the specimen pan. If the multiplication of the lever mechanism is 50 it will take 50 articles on the platform to balance the counting lever 29. The lever mechanism may, however, be of any desired multiplication. If the articles to be counted are placed in a box or other container, the container may be counterbalanced by means of a tare poise 35 slidably carried by a beam 36, the beam being suitably supported by the lever 7.

In the use of a counting device of this type it is very easy to ascertain an accurate position of balance of the counting beam, as the indicating hand 25 forming a part of the automatic mechanism will register with the zero or initial graduation on the chart 26. It is also apparent that due to the particular construction of the weighing and counting levers and the position of the tare beam the tare poise 35 may be used to offset tare weight in counting as well as in weighing operations.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a frame, weighing mechanism supported upon said frame, a supplemental frame, a counting beam fulcrumed upon said supplemental frame, means for attaching the supplemental frame to the main frame, means including a link for operatively connecting said counting beam to said weighing mechanism, and means for rendering said counting beam inoperative during weighing operations.

2. In a device of the class described, in combination, a frame comprising a plurality of connected elements, weighing mechanism supported upon said frame, a supplemental frame, counting mechanism supported upon said supplemental frame, means whereby said supplemental frame may be interposed between certain of said elements forming said scale frame, and means for operatively connecting said counting mechanism with said weighing mechanism.

3. In a device of the class described, in combination, a housing, weighing mechanism supported within said housing, a counting beam fulcrumed upon said housing exteriorly thereof, an intermediate lever connected to said counting beam and projecting into said housing, and operative connections between the intermediate lever and said weighing mechanism.

4. In a device of the class described, in combination, a housing, weighing mechanism supported within said housing, a collar connected to said housing, counting mechanism supported by said collar, and operative connections between said weighing and counting mechanism.

5. In a device of the class described, in combination, a frame, weighing mechanism including a weighing beam supported upon said frame, a counting beam fulcrumed upon said frame, a motion multiplying lever interposed between said weighing and counting beams, operative connections between said motion multiplying lever and said weighing and counting beams, and means for locking said counting beam during weighing operations.

6. In a device of the class described, in combination, a frame, automatic weighing mechanism supported upon said frame, a weighing beam and a counting beam fulcrumed upon said frame, a supplemental lever, and connections between the supplemental lever and the automatic weighing mechanism, the weighing beam and the counting beam, said connections engaging the lever at separated points.

7. In a device of the class described, in combination, a frame, automatic weighing mechanism supported upon said frame, a weighing beam and a counting beam fulcrumed upon said frame, a supplemental lever, connections between the supplemental lever and the automatic weighing mechanism, the weighing beam and the counting beam, said connections engaging the lever at separated points, and means for locking said counting beam against relative movement during weighing operations.

8. In a device of the class described, in combination, weighing mechanism including a weighing beam, a commodity-receiver connected to said weighing beam, a counting beam, a specimen pan connected to said counting beam, and a supplemental lever interposed between said weighing and counting beams, said lever having connections to said weighing and counting beams so as to provide a fixed ratio between the commodity-receiver and specimen pan.

CLARENCE H. HAPGOOD.